UNITED STATES PATENT OFFICE.

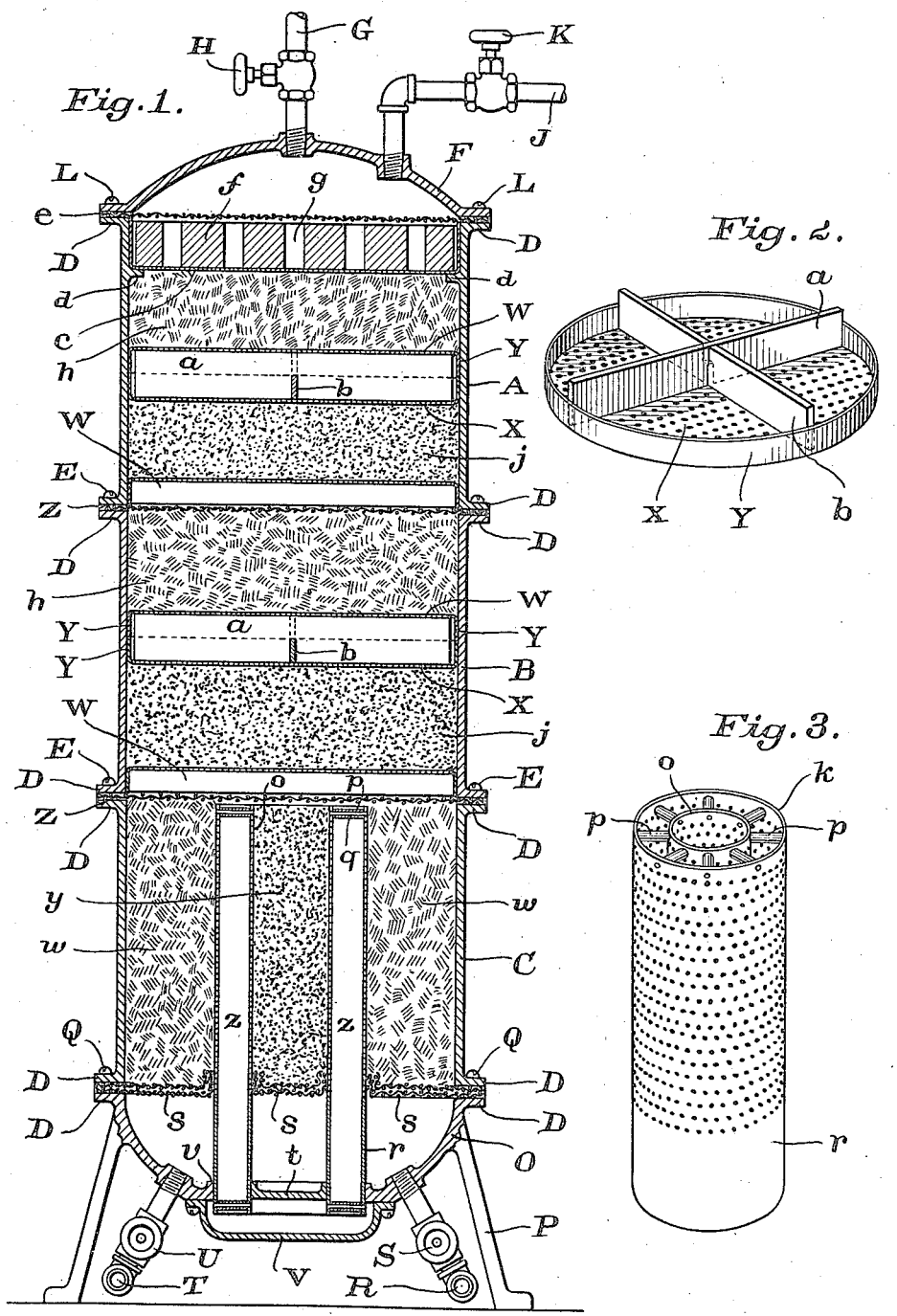

CAROLYN S. SMITH, OF BROOKLYN, NEW YORK.

FILTERING APPARATUS.

1,293,651.  Specification of Letters Patent.  Patented Feb. 4, 1919.

Application filed April 6, 1914, Serial No. 829,811. Renewed June 26, 1918. Serial No. 242,094.

*To all whom it may concern:*

Be it known that I, CAROLYN S. SMITH, a citizen of the United States, and a resident of the borough of Brooklyn, county of Kings, city and State of New York, have invented certain new and useful Improvements in Filtering Apparatus, of which the following is a specification, accompanied by drawings.

This invention relates to filtering apparatus, more particularly to portable apparatus or to a filter which may be attached to the house or office water supply system for filtering the water as it comes from the mains, although some features of the invention may be applied to various other types of filtering apparatus. The primary objects of the invention are to increase the degree of purity of the water, by setting up galvanic action in the filter and also by providing the proper kinds of filtering material in conjunction with improved means for collecting and removing the impurities which are thrown down in the filter.

Other objects are to make the apparatus as simple and cheap as possible, provide means for readily assembling and taking the filter apart and produce an apparatus which is readily transported from place to place.

The invention is illustrated in one of its preferred forms in the accompanying drawings, in which—

Figure 1 is a vertical sectional elevation of apparatus embodying the invention;

Fig. 2 is an enlarged detail prespective view of a portion of one of the galvanic couples, showing a separator; and Fig. 3 is a detail perspective view of another portion of the apparatus which forms a galvanic couple and is arranged to aid in collecting impurities.

Referring to the drawings, the filtering apparatus comprises essentially a plurality of unit sections A, B and C of which there may be as many as desired, in this instance three units being shown, built up, one on top of the other and provided with flanges D secured together by any suitable means, as the bolts E. The cover F is provided with the outlet G having a suitable valve H and is also provided with the cleaning pipe J having a valve K. The pipe J may be connected to a source of water supply under pressure and water forced downwardly through the filter to clean it. The cover may be connected to the upper unit A as by means of the bolts L.

A suitable stand or frame O is provided for the apparatus, having legs P and this stand also forms a portion of the bottom of the filtering apparatus. The lowermost section C may be connected to the stand as by means of the bolts Q. The inlet pipe R is provided with a suitable valve S and may be connected to a source of water supply in the building for supplying water to be filtered, and an outlet pipe T is provided with a valve U for drawing off the water and impurities. A bottom pan or receptacle V is suitably secured and removably secured over the bottom opening of the stand O for collecting impurities and this pan V may be removed from time to time for cleaning purposes.

Partitions forming galvanic couples are inserted in the unit sections at suitable intervals and preferably the partitions at the central portions or mid portions of the units are formed of perforated plates W and X of thin sheet metal, which are provided with the flanges Y. These dish-shaped perforated members are placed one on top of the other, as shown in the drawings, so that the flanges or rims Y are in contact with each other. The perforated members are formed of different metals as brass and aluminum or any other suitable metals which will form a galvanic couple and set up a galvanic action in the filter for purifying the water. The separators between the perforated plates W and X may be used as desired and a suitable form of separator is shown in Fig. 2, in which metal strips $a$ and $b$, preferably of aluminum, are arranged to form a cross. These strips are slotted essentially so that one will fit over the other, but any suitable construction may be provided.

The galvanic couples formed by the members W and X are readily slipped into position in the unit sections.

At the joints or unions between the unit sections, I prefer to use the members W of the galvanic couples for one element of the couple and for convenience I arrange a perforated or screen-like member which may be a piece of wire mesh Z between the meeting flanges D of the unit sections and in contact with the member W. By making the wire mesh Z of different metal from the member W, I obtain a galvanic couple.

In the top of the uppermost section A a perforated member C is preferably arranged and supported by the flange d. A wire screen e of different metal is held between the meeting flanges of the section A of the cover F forming a couple with the member c. In the dish-shaped member c I preferably place any suitable composition of material which is capable of being dissolved by the action of the water and will aid in purifying the water. This material may be an alloy of aluminum and sodium. I have shown this material f in the form of a block having the perforations g through which the water passes. While it is not necessary to disclose the composition of this particular material f, it is sufficient to say that it should be a material which is very slowly dissolved by the water.

Suitable filtering material is arranged in alternate layers between the galvanic couples and I have found that excellent results are obtained by alternating layers of flint and graphite, the layers H being flint, the layers J being graphite.

In the lowermost section C, instead of the horizontal partition forming galvanic couples, I insert a vertically arranged galvanic couple shown in detail in Fig. 3, which also forms a passage-way for the collection of impurities, as they percolate to the bottom of the apparatus. This vertical couple preferably comprises concentric cylinders k and o of thin sheet metal connected radially at top and bottom, as by means of the metallic sleeves p through which pins q are passed and these pins q are fastened to the cylinders, spacing the cylinders apart and holding them together in proper relationship. These concentric cylinders are preferably perforated for the major portion of their length, as shown in Fig. 3, but the lower portion R of the cylinders is solid, and at about the place where the perforations end, one or more wire screens S are soldered or otherwise secured to the outer cylinder. When the cylinders are inserted in the lower unit section C, the screens s are fastened between the flanges D of the section and the stand, as shown in Fig. 1. A plate t is also permanently secured inside the innermost cylinder at the bottom and the outermost cylinder k fits substantially snugly in the opening v in the bottom of the stand O.

Filtering material in the form of flint w is placed between the cylinders and the walls of the section C and filtering material in the form of graphite y is placed inside the innermost cylinder o.

In the operation of the filter, the water entering through the inlet pipe R cannot pass directly into the space z between the cylinders o and k, because of the solid walls r of the cylinders, although some water may percolate through the screen s in to the space z. The water will be forced upwardly through the filtering material w and y and thus upwardly through the partitions and remaining filtering material in the apparatus to the outlet G. The galvanic action of the couples throughout the apparatus aids in purifying the water and I have found that apparently the flint forming the filtering material remains substantially clean as compared to the graphite and remains of a more or less whitish color, so that if a free path is afforded for the impurities in their downward passage, such as the path provided for the space z between the cylinders, the large portion of the impurities will be collected in the pan V in the bottom of the apparatus. Some water, of course, passes through the perforated portions of the cylinders into the space z but this does not prevent the downward passage of the impurities as far as I have been able to determine. While I am not able to state the exact theory of this cleaning feature of the apparatus and I do not wish to be limited to any particular theory, I cannot account for the action any other way than that described. The galvanic action purifies the water in a marked degree, so that water so treated is beneficial, not only because of its purity, but because of the oxygen liberated and contained in the water.

I claim and desire to obtain by Letters Patent the following:

1. A filtering apparatus comprising a tank and a transverse partition in said tank, said partition consisting of perforated dish-shaped members of different metals having their edges in contact with each other, forming a galvanic couple.

2. A filtering apparatus comprising a tank and a transverse partition in said tank, said partition consisting of perforated plates of different metals having flanged rims, said rims being in contact with each other, forming a galvanic couple.

3. A filtering apparatus comprising a tank, and a transverse partition in said tank, said partition consisting of at least one perforated dish-shaped member of one kind of metal and a perforated member of another kind of metal arranged across said plate and in contact therewith forming a galvanic couple.

4. A filtering apparatus comprising a tank, transverse partitions therein forming galvanic couples, a perforated or screenlike partition of the lower portion of the tank, and concentric perforated cylinders extending upwardly through said lowermost partition, said cylinders being of different metals and electrically connected to form a galvanic couple.

5. A filtering apparatus comprising a tank and a transverse partition in said tank, said partition consisting of perforated dish-shaped members of different metals having their edges in contact with each other, forming a galvanic couple, and a separator comprising crossed members between said perforated members.

In testimony whereof I have signed this specification in the presence of two subscribing witnesses.

CAROLYN S. SMITH.

Witnesses:
A. D. WEEKES, Jr.,
HERBERT G. OGDEN.